United States Patent [19]
Higbee et al.

[11] 3,751,758
[45] Aug. 14, 1973

[54] CASTER AND SWIVEL LOCK ASSEMBLY

[75] Inventors: Roland K. Higbee; David C. Fleck, both of Cincinnati, Ohio

[73] Assignee: American Hospital Supply Corporation, Evanston, Ill.

[22] Filed: July 5, 1972

[21] Appl. No.: 269,285

[52] U.S. Cl............................ 16/35, 188/1, 280/79.1
[51] Int. Cl.............................................. B60b 33/00
[58] Field of Search...................... 16/35 R, 35 D; 188/1 D; 280/79.1, 78

[56] References Cited
UNITED STATES PATENTS

| | | | |
|---|---|---|---|
| 3,636,586 | 1/1972 | Ballinger et al. | 16/35 |
| 3,070,828 | 1/1963 | Clinton et al. | 16/35 |
| 189,897 | 4/1877 | Mey | 16/35 |

*Primary Examiner*—Francis K. Zugel
*Assistant Examiner*—Kenneth J. Dorner
*Attorney*—Dawson, Tilton, Fallon & Lungmus

[57] ABSTRACT

A self-aligning swivel caster for use on carts and the like, the caster being equipped with a releasable locking member capable of selectively locking the caster against swivel movement. The locking member is gravity actuated and may be latched in an operative position as desired. The structural relationship of the caster and locking member are such that automatic camming and subsequent actuation of the locking member occur as the caster wheel is swiveled from an unlocked position into a position in which it is capable of being locked; during actuation of the locking member, direct contact is made between such member and the wheel until finally the member drops into its locking position to prevent further swivel action of the wheel.

9 Claims, 5 Drawing Figures

PATENTED AUG 14 1973

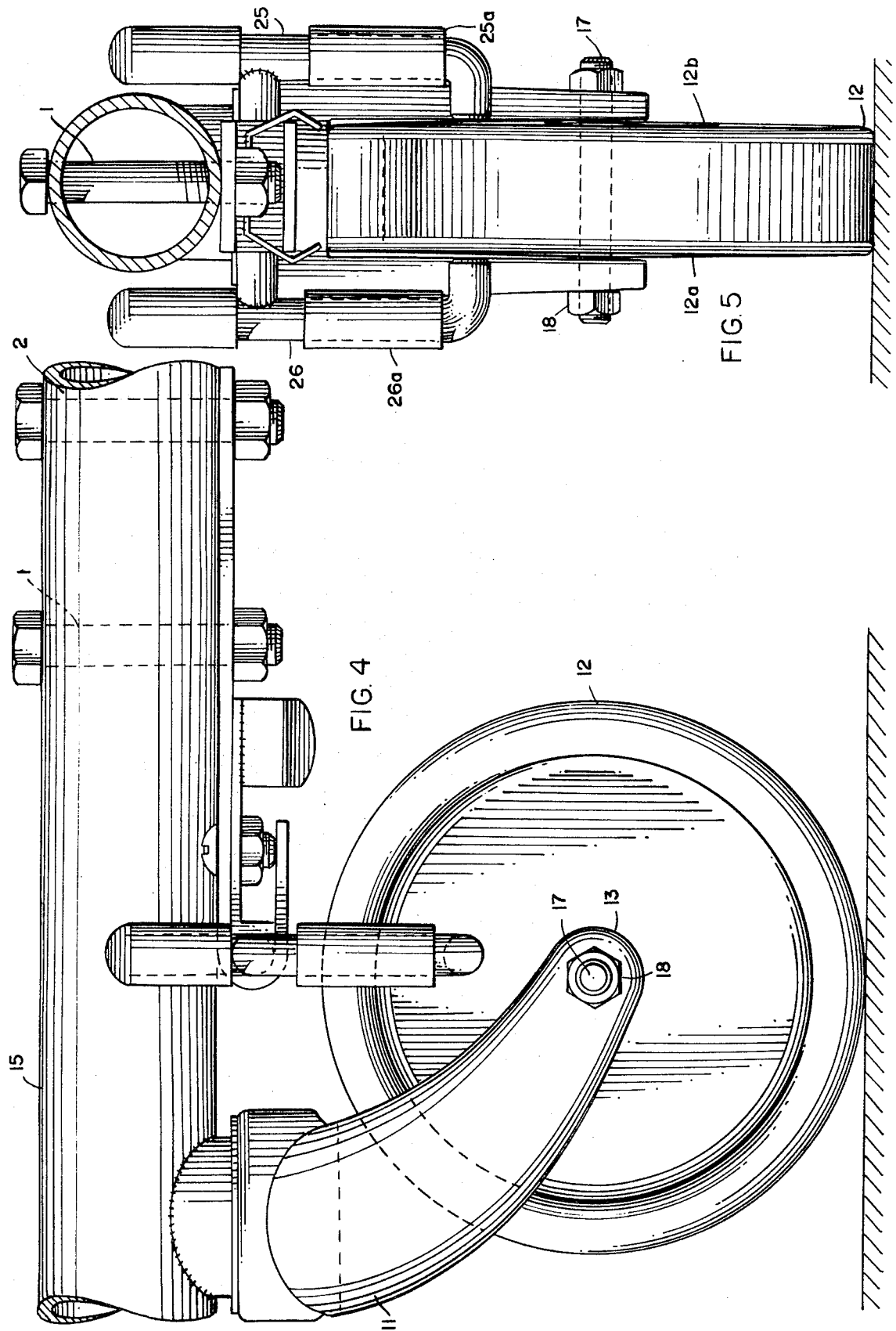

CASTER AND SWIVEL LOCK ASSEMBLY

BACKGROUND

As is well known, caster wheels are commonly provided on carts and other moveable equipment and, in most instances, casters at least at one end of such equipment are capable of swiveling so as to make that end, and the equipment as a whole, more maneuverable. It is apparent, however, that if all wheels of a cart or other equipment are free to swivel, then the difficulties in maintaining directional control may actually reduce the units maneuverability. Such a cart may tend to drift laterally as it is pushed or pulled. While such problems may be overcome by using non-swiveling casters at the front of a push-cart or at the rear of a pull-cart, such an arrangement usually results in a cart which can be easily maneuvered only if it is pushed or pulled from the end equipped with swivel casters. In many instances, especially where the equipment is relatively large and heavy, or where maneuvering time must be reduced as much as possible (as where such casters are used on stretchers or other emergency hospital equipment), the limitations on maneuverability resulting from the provision of swivel casters at only one end may present as much of a problem as the lack of directional stability should the swivel casters be provided at both ends.

The prior art is exemplified by the U.S. Pat. Nos. 3,636,586 and 3,070,828. Co-owned U.S. Pat. No. 3,636,586 reveals a construction in which a locking member cooperates directly only with the fork of the caster in order to achieve effective automatic locking against swivel action.

SUMMARY OF THE INVENTION

A caster and swivel lock assembly is provided, the lock permitting the caster to be secured against swivel movement with the caster wheel in a longitudinally-aligned position. The locking member comprises the shaft with the transverse horizontal axis spaced above the caster wheel and behind the caster's vertical swivel axis. The shaft is pivotally supported by a bracket adapted to be fixed to the cart or other equipment, and has a pair of spaced parallel fingers which normally straddle the caster wheel and lock it against swivel action. These fingers support bearing sleeves which rotate about the fingers to facillitate the camming action of the wheel during the locking procedure.

The caster is of the self-aligning type with the axis of the wheels spaced behind the vertical swivel axis. The pivot axis of the locking member is behind but apart from the swivel axis; in the preferred embodiment, the axis of the locking member is directly or almost directly above the axis of the wheel when the wheel is in its normal trailing position. Consequently, swivel action of the wheel from a non-trailing position into its normal trailing position while the locking member is lowered results in engagement between one of the locking fingers and the periphery of wheel, and continued swivel action of the wheel towards its normal trailing position automatically cams the locking member into a raised position. The rotating sleeves covering the fingers provide a smooth camming action, especially when the finger is in direct contact with the outer edge of the wheel. Finally, when the wheel has fully swiveled into its trailing position, the locking member is free to pivot downwardly under the influence of gravity to lock the wheel against further swivel action. In a preferred embodiment, the wheel is provided with a pair of non-rotating guard discs attached perpendicularly of the axis of rotation of the wheel, and the sleeve fingers engage these discs as opposed to a rotating portion of a normal wheel.

For those applications which require it, the caster is equipped with the spring latching member for holding the locking member in its inoperative position. Release of the locking member from its latched position, or movement of it from an operative to an inoperative position may be easily and quickly accomplished by any conventional means, for example engaging and lifting the locking member with the toe.

DRAWINGS

FIG. 4 is a side elevational view of the caster with the locking member in operative position; and FIG. 5 is an end elevational view of the caster with its locking member in operative position.

DETAILED DESCRIPTION

Figure 1:
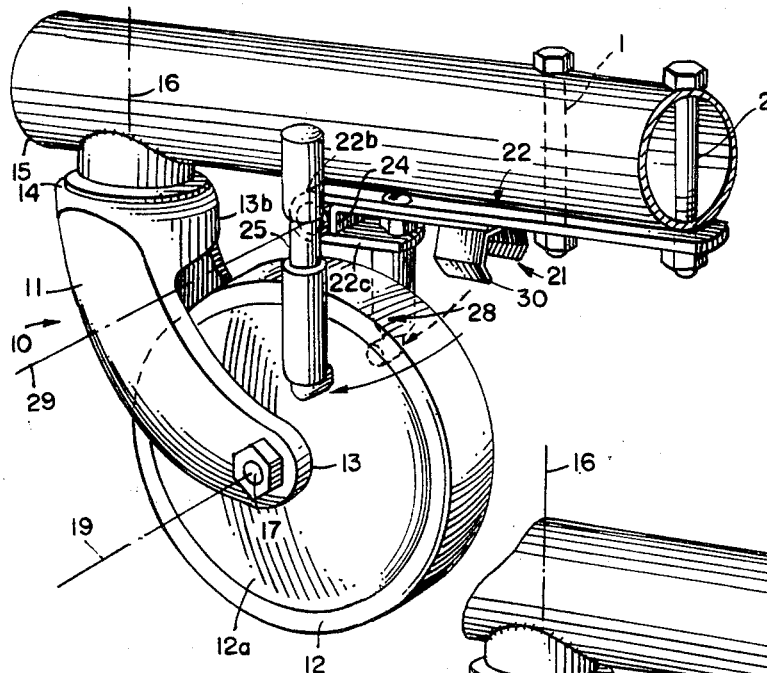
FIG. 1 is a perspective view illustrating a caster of present invention mounted on a tubular frame bar with its locking member in operative position.

In the embodiment of the invention illustrated in the drawings, the numeral 10 generally designates the complete caster and swivel lock combination. In that combination, the caster assembly 11 is conventional and consists of a caster wheel 12, a fork 13, and a mounting plate 14. The caster is mounted onto a hollow tubular frame bar 15 by means of a locking bolt (not shown). The tubular frame bar shown is commonly utilized on hospital stretchers or the like, but the present invention could be employed on any suitable, moveable equipment. The fork is pivotally connected to the mounting plate for rotation about a generally vertical swivel axis 16, and the axle 17 of the caster wheel is secured to the lower ends of the fork by nuts 18 or other appropriate attachment means. The caster is of the self-aligning type; that is, the horizontal axis 19 of wheel 12 is spaced behind the swivel axis 16 so that as the caster is moved it will automatically swivel into the trailing position illustrated in FIG. 1. The wheel, or at least its peripheral portion, is formed of rubber or other resilient material which cushions operation of the cart and tends to prevent skidding or slipping of the wheel on a smooth surface. Since the caster assembly is conventional and its components and structure are well known, further description of its structure and operation, except to the extent that it bear directly on the cooperative relationship between the caster assembly and swivel lock assembly, is believed unnecessary herein.

As shown in the figures, the fork 13 of the caster is of bifurcated configuration, having curved, depending side portions 13a and a cylindrical, generally horizontal connecting portion 13b. The connecting portion is spaced beneath mounting plate 14 and is preferably formed integrally with the depending side portions 13a.

The swivel lock assembly is generally designated by the numeral 21 and includes a bracket 22 attached to the frame bar 15 separate and apart from the caster assembly 11. As shown, it is positioned behind the assembly described, to facilitate the locking procedure later to be described, It consists of an attachment segment 22 bolted to the frame bar 15; one end of the segment is then bent to form a U-shaped portion 22b rotatably receives the horizontal shaft 23. A stop bar 24 is provided rearwardly of the U-shaped portion 22b to form a horizontal space for shaft 23. A pair of spaced finger action elements 25 and 26 extend radially from shaft 23 for a distance less than the radius of wheel 12. As shown in the drawings, the finger elements 25 and 26 are substantially parallel and are spaced apart at a distance slightly greater than the width of wheel 12.

Shaft 23 and finger elements 25 and 26 together constitute a locking member 28 for locking the caster in swivel action. Each finger element rotatably supports a hollow, cylindrically shaped bearing sleeve, designated respectively as 25a and 26a. These sleeves are adapted to rotate freely about the finger elements which facilitates the locking procedure during use as will be explained more fully below. It will be observed that the pivot axis 29 of the locking member — that is, axis of shaft 23 — is disposed substantially directly above the axis 19 of wheel 12 with the caster is in its trailing position illustrated in FIG. 4. FIG. 1 illustrates the locking member in its operative position with locking fingers 25 and 26 straddling the wheel and locking it against the movement about swivel axis 16. It will be noted that the fingers engage only the side of the wheel and do not touch the fork 13; in conjunction with the other elements of this invention, this mechanism allows smooth, trouble-free locking of the caster in its trailing position.

Additional advantages can be derived from the present construction if a pair of guard discs 12a and 12b are mounted on the axle 17 on each side of wheel 12. The discs or plates are actually mounted for rotation independent of each other and of the wheel; however, such discs do not usually rotate during normal operation of the caster. One purpose of such discs is to prevent string or the like from winding about the axle; another is to provide generally non-rotating surfaces for the engagement of fingers 25 and 26 to prevent damage to the wheel.

Figure 2:
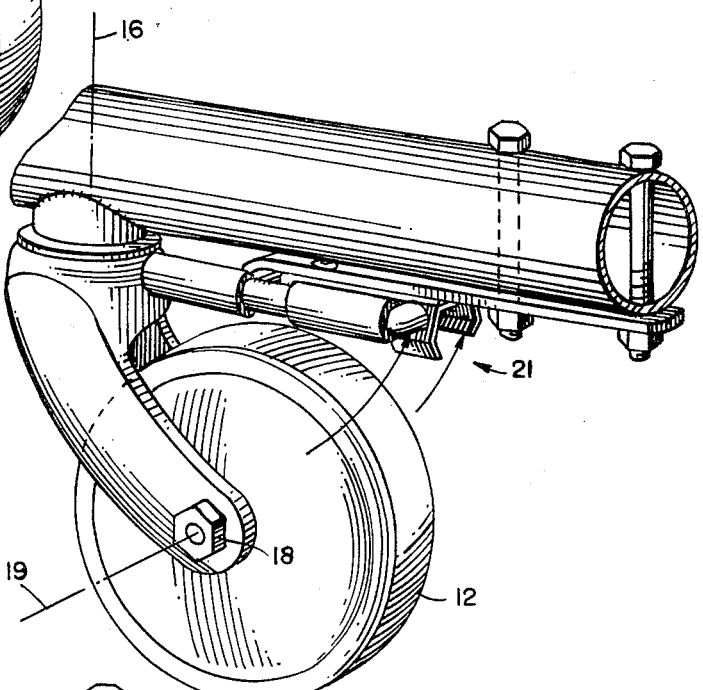
FIG. 2 is a perspective view similar to FIG. 1 but showing the locking member in its raised or inoperative position.

FIG. 2 illustrates the locking member in its raised or inoperative position. In that position, the fingers 25 and 26 extend rearwardly and outwardly above wheel 12 and fork 13, free of engagement therewith. Retaining or latching means in the form of a retention spring 30 serves to frictionally maintain the locking member in its raised inoperative position. As shown, the spring is fixed to the attachment segment 22 of the swivel lock assembly 21 which is, as described previously, attached to the tubular frame bar 15; the two flange portions 30a and 30b extend outwardly and downwardly to simultaneously engage the ends of locking fingers 25 and 26 when the locking member is raised. The latching force of the spring maybe overcome whenever desired by simply urging the locking member downward, thereby releasing the locking member and permitting it to drop downwardly under the influence of gravity into the locking position shown in FIG. 1.

It is to be understood that the mounting bracket 22, and the latching spring 30 secured thereto maybe attached together by welding or by any other suitable means. As shown, the mounting bracket 22 is secured to the tubular frame bar 15 by bolts 1 and 2 (see FIG. 4); the stop bar 24 is bolted to the mounting bracket 22 by way of conventional bolts; and the spring 30 is welded to the stop bar 24. Of course any other mounting arrangement would suffice if it meets essential criteria of this invention.

An important aspect of this invention lies in the fact that the locking member may be released when the wheel is in a non-locking position and will thereafter automatically lock the caster against the swivel action when the wheel swings into its trailing position. Thus, referring to FIG. 3, caster 11 is illustrated as it is pivoting about swivel axis 16 in a clockwise direction (viewed from above) represented by arrow 3. As it swivels, the wheel directly engages the sleeve 25a covering finger element 25 of the locking member to pivot that member upwardly about the axis 29 of shaft 23. The wheel therefore cams the locking member into a partially raised position and retains it in that position until the wheel has swiveled into its normal trailing position, at which time the locking member will pivot downwardly under the influence of gravity into the locking position of FIG. 1 to secure the caster against further swivel action until the locking member is intentionally raised. Similarly, if the caster wheel swivels in the opposite direction about axis 16, an identical camming action will occur with the wheel camming the opposite finger element.

Figure 3:
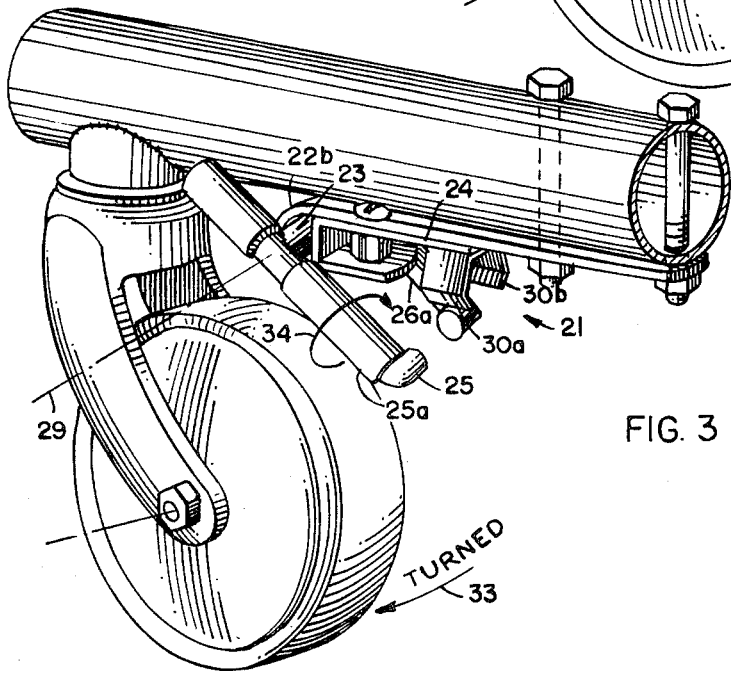
FIG. 3 is a perspective view illustrating the cooperative camming action of the caster wheel upon the sleeve finger of the locking member as the caster wheel swivels in one direction or the other towards a normal trailing position, and the sleeve rotates to facilitate the actuation of the locking member.

The function of the sleeves 25a and 26a will now be more fully described. As shown in FIG. 3, the camming action of the wheel 12 will cause the sleeve 25a to rotate upon its supporting finger, the direction of rotation being indicated by arrow 34. The rotating sleeve rolls over the outer edges of the wheel 12 to provide bearing means which facilitates the camming action. In this way a smooth, chatter-free locking action is possible despite direct contact between the resilient periphery of the wheel and the locking member. Any "bouncing" action of the locking member which might otherwise be caused by such direct contact and which might interfere with smooth operation of that member is effectively prevented.

The automatic camming and locking action of the swivel lock of this invention may be utilized by arranging the casters in various ways, depending on the manner in which a particular cart is intended to be used. In general, the end of the cart to which the moving force (either pushing or pulling) is to be applied should have a locking member on the leading side of the caster at that end, thereby leaving such end free for lateral maneuvering. The end of the cart opposite from the end to which the moving force is applied should have a locking member on the trailing side of the caster, thereby locking such end against lateral movement.

While in the foregoing an embodiment of the invention has been disclosed in considerable detail for the purposes of illustration, it will be understood by those skilled in the art that many of these details may be varied without departing from the spirit and scope of the invention.

The claims:

1. A swivel caster assembly including a mounting member, a fork connected to said mounting member for swivel action about a generally vertical swivel axis, and a wheel supported by said fork for rotation about a horizontal axis of rotation, said axis of rotation being spaced behind said swivel axis when said wheel is in a normal trailing position, the improvement wherein a locking member is pivotally mounted and positioned for releasably locking said wheel in said trailing position, said locking member comprising a transverse horizontal shaft and a pair of spaced parallel fingers projecting radially therefrom, said fingers rotatably supporting a pair of bearing sleeves thereon, means supporting said shaft for pivotal movement of said member between a locking position wherein said fingers are lowered to straddle said wheel and a releasing position wherein said fingers are raised above said wheel, said shaft having its axis disposed behind said swivel axis, said sleeves being directly engageable with the periphery of said wheel when said fingers are lowered and when said wheel is swiveled towards its trailing position to ride upon said wheel and thereby promote smooth movement of said locking member from lowered to partially raised positions, said locking member thereafter pivoting under the influence of gravity into its locking position when said caster wheel fully reaches its trailing position.

2. The structure of claim 1 in which said periphery of said wheel is formed of a resilient skid-resistant material.

3. The structure of claim 1 in which means are provided for releasably holding said locking member in said releasing position.

4. The structure of claim 3 in which said means for releasably holding said locking member in said releasing position comprises a spring member frictionally engageable with at least one of said fingers when said fingers are raised.

5. The structure of claim 1 in which said axis of said shaft is spaced from said swivel axis.

6. The structure of claim 5 in which said axis of said shaft is disposed substantially directly above said rotational axis of said wheel when said wheel is in its trailing position.

7. The structure of claim 1 in which said sleeved fingers are dimentioned and proportioned for engagement with a pair of guard discs disposed on opposite sides of wheel.

8. The structure of claim 7 in which said guard discs are rotatable independently of said wheel.

9. The structure of claim 2 in which said peripheral portion is formed of rubber.

* * * * *